United States Patent
Niemeyer et al.

(10) Patent No.: US 9,798,221 B2
(45) Date of Patent: Oct. 24, 2017

(54) MOTORIZED MONOPOD JIB FOR CAMERAS

(71) Applicant: Disney Enterprises, Inc., Burbank, CA (US)

(72) Inventors: Gunter Niemeyer, Pasadena, CA (US); Miquel Angel Farre Guiu, Bern (CH); Vince Roberts, Thousand Oaks, CA (US); Anthony Accardo, Glendale, CA (US); Michael Holton, Manhattan Beach, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/934,043

(22) Filed: Nov. 5, 2015

(65) Prior Publication Data

US 2016/0246162 A1    Aug. 25, 2016

Related U.S. Application Data

(60) Provisional application No. 62/119,077, filed on Feb. 20, 2015.

(51) Int. Cl.
*G03B 17/56* (2006.01)
*G03B 5/00* (2006.01)
(Continued)

(52) U.S. Cl.
CPC .......... *G03B 17/561* (2013.01); *F16M 11/10* (2013.01); *F16M 11/18* (2013.01);
(Continued)

(58) Field of Classification Search
CPC ....... G03B 17/561; F16M 11/18; H04N 5/232
(Continued)

(56) References Cited

U.S. PATENT DOCUMENTS

| 5,963,749 A | 10/1999 | Nicholson |
| 2005/0185089 A1* | 8/2005 | Chapman ............... F16M 11/10 348/375 |

(Continued)

FOREIGN PATENT DOCUMENTS

| CN | 203811969 U | 9/2014 |
| CN | 204437648 U | 7/2015 |
| EP | 2919064 A1 | 9/2015 |

OTHER PUBLICATIONS

Afanasiev, Andrey, European Search Report for European Patent Application Serial No. 16183612, Mar. 17, 2017, 3 pages, The Hague, Netherlands.

*Primary Examiner* — Rochelle-Ann J Blackman
(74) *Attorney, Agent, or Firm* — Ference & Associates LLC

(57) ABSTRACT

An embodiment provides a motorized monopole for a camera, including: a hand-held monopole; a first motor positioned at an end of the hand-held monopole; a first connecting element attached to the first motor; a second motor positioned at an end of the first connecting element; a second connecting element attached to the second motor; a third motor positioned at an end of the second connecting element; and a camera mounting plate attached to the second connecting element by the third motor, where components of the multi-axis gimbal are positioned such that a camera viewing axis, a horizontal image axis, and a vertical image axis of a camera mounted on the camera mounting plate need not be aligned with any of a rotational axis of the first motor, a rotational axis of the second motor, or a rotational axis of the third motor. Other aspects are described and claimed.

22 Claims, 8 Drawing Sheets

(51) Int. Cl.
*F16M 11/18* (2006.01)
*F16M 11/10* (2006.01)
*F16M 11/20* (2006.01)
*F16M 13/00* (2006.01)
*F16M 13/04* (2006.01)

(52) U.S. Cl.
CPC ........ *F16M 11/2071* (2013.01); *F16M 13/00* (2013.01); *F16M 13/04* (2013.01); *F16M 2200/041* (2013.01); *F16M 2200/044* (2013.01); *G03B 17/563* (2013.01); *G03B 17/566* (2013.01)

(58) Field of Classification Search
USPC .......................... 396/419–428; 348/375, 376
See application file for complete search history.

(56) References Cited

U.S. PATENT DOCUMENTS

| | | |
|---|---|---|
| 2015/0219981 A1 | 8/2015 | Roberts et al. |
| 2016/0033077 A1* | 2/2016 | Chen ...................... F16M 13/04 294/139 |
| 2016/0170289 A1* | 6/2016 | Matt ................... G03B 17/561 318/560 |

\* cited by examiner

MOTORIZED MONOPOD JIB FOR
CAMERAS

CROSS REFERENCE TO RELATED
APPLICATIONS

This application claims priority to U.S. Provisional Patent Application Ser. No. 62/119,077, filed on Feb. 20, 2015 and entitled "MOTORIZED MONOPOD JIB FOR CAMERAS," the content of which is incorporated by reference herein.

BACKGROUND

A three-axis gimbal is used in camera stabilization systems to give the camera operator freedom of motion during shooting while reducing visual artifacts in the shot due to that motion, e.g., camera vibration or shake. A stabilized or controlled gimbal, e.g., using brushless motors, has the ability to keep a camera at a predetermined angle, e.g., level on all axes, as the camera operator moves the camera about. An inertial measurement unit (IMU) responds to movement and uses motors in a coordinated fashion to stabilize the camera. Guidance instructions or logic permit a stabilizer system to detect and respond to differences between deliberate movement of the camera operator and unintentional movement, e.g., shaking.

BRIEF SUMMARY

In summary, one embodiment provides a motorized multi-axis gimbal for a camera, comprising: an attachment for securing a hand-held monopole; a plurality of motors connected to the multi-axis gimbal; and an attachment for a camera mounting plate; the plurality of motors providing a plurality of independent rotational axes for movement of gimbal components; and the plurality of motors in operative connection with a processing unit that issues coordinated rotational commands to control movement of an attached camera; wherein components of the multi-axis gimbal are positioned such that a camera viewing axis, a horizontal image axis, and a vertical image axis of a camera mounted on the camera mounting plate need not be aligned with any of a rotational axis of the plurality of motors Another embodiment provides a motorized monopole for a camera, comprising: a hand-held monopole attached to a multi-axis gimbal; a first motor positioned at an end of the hand-held monopole; a first connecting element of the multi-axis gimbal attached to the first motor, the first motor imparting active rotational movement to the first connecting element with respect to the monopole; a second motor positioned at an end of the first connecting element; a second connecting element of the multi-axis gimbal attached to the second motor, the second motor imparting active rotational movement to the second connecting element with respect to the first connecting element; a third motor positioned at an end of the second connecting element; and a camera mounting plate of the multi-axis gimbal attached to the second connecting element via the third motor, the third motor imparting active rotational movement to the camera mounting plate with respect to the second connecting element; wherein components of the multi-axis gimbal are positioned such that a camera viewing axis, a horizontal image axis, and a vertical image axis of a camera mounted on the camera mounting plate need not be aligned with any of a rotational axis of the first motor, a rotational axis of the second motor, or a rotational axis of the third motor.

A further aspect provides a motorized multi-axis gimbal for a camera, comprising: an attachment for securing a hand-held monopole; a first motor positioned at the attachment and imparting active rotational movement about a first axis of rotation; a second motor imparting active rotational movement about a second a second axis of rotation; a third motor operatively coupled to a camera mounting plate, the third motor imparting active rotational movement about a third axis of rotation; wherein components of the multi-axis gimbal are positioned such that a camera viewing axis, a horizontal image axis, and a vertical image axis of a camera mounted on the camera mounting plate need not be aligned with any of a rotational axis of the first motor, a rotational axis of the second motor, or a rotational axis of the third motor.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL
VIEWS OF THE DRAWINGS

DETAILED DESCRIPTION

Figure 1:
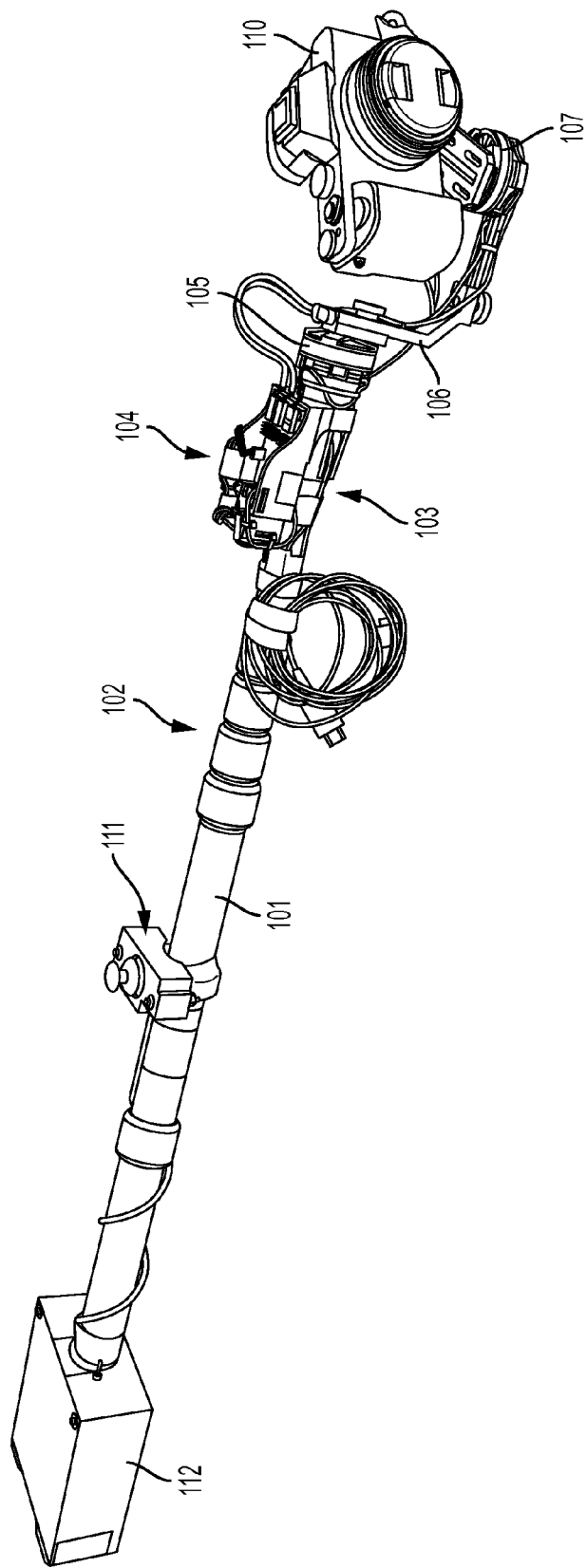
FIG. 1 illustrates a view of an example motorized, hand-held monopole.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail to avoid obfuscation. The following description is intended only by way of example, and simply illustrates certain example embodiments.

An embodiment provides a hand-held jib ("jib," "monopod," "monopole" and "boom" are used interchangeably herein), e.g., as described in co-pending and commonly assigned U.S. patent application Ser. No. 13/843,878, filed on Mar. 15, 2013; and Ser. No. 14/172,442, filed on Feb. 2, 2014, the contents of each of these applications is incorporated by reference herein. An embodiment provides a serial arrangement of a monopole, an attachment for fixing the monopole to a gimbal, a gimbal (for example a three-axis gimbal including three motors and linkages or connecting element(s)), a camera platform, and a camera. In an embodiment, a multi-axis gimbal is provided by virtue of a plurality of motors (e.g., three or more) arranged to provide rotational movement about independent axes. The motors may have their movements coordinated to provide active movement of a camera (e.g., panning, tilting or rotating of the camera's viewing axis or angle) as well as coordinated stabilization of the camera.

An embodiment uses sensors to provide active stabilization as well as assisted camera movement. For example, an embodiment may include one or more inertial measurement units (IMU), including for example accelerometer(s) that detect accelerations, gyroscope(s) that detect changes in rotational attributes like pitch, roll and yaw, and in some cases also including magnetometers, e.g., to assist in managing orientation drift.

Use of such active stabilization and control permits an embodiment to stabilize a camera mounted on the end of a monopole and to control the movement of the camera in pitch, yaw and roll with respect to a camera operator's commands. The camera operator may provide commands via a user interface mounted for example on the monopole and/or via movement, e.g., rotation, of the monopole or boom itself. An embodiment stabilizes and controls the camera with degree(s) of freedom, e.g., tilt, roll and/or pan, that are controlled via motorized action for example provided by brushless motors at various axis points in the unit. This allows the camera operator to remain in control of the shot even when moving the monopole.

In an embodiment, a support unit, e.g., gimbal or like structural element(s), is/are provided with an offset. By way of example, as opposed to a gimbal including a motor positioned approximately 90 degrees from the line of sight of the camera (i.e., to the left or right), an embodiment repositions the motor to be mounted at approximately 45 degrees further to the right or left of the camera view axis, e.g., by mounting the camera on the camera mounting plate at an angle, e.g., about 45 degrees. In other words, when the gimbal is operating and the camera is commanded to look forward, the motor thus has to move approximately 135 degrees, e.g., to the left/behind the camera. This permits the camera operator to take shots that are unencumbered by various supporting structures, e.g., motors or support elements of the unit, opening up a wider range of useable shot angles.

In an embodiment, motors (e.g., DYS BGM4108-130 or FOXTECH motors) may be controlled by a user interface, such as a joystick type controller or other suitable user interface, to point the camera at a target location. For example, the user may select the target location by manipulating the user interface joystick and/or manipulation of the boom, or even by specifying a distance from the camera or an altitude. The target location may be fixed or the target location may vary, e.g., to track a moving target object. For example, the location of a moving target object may be determined automatically by computationally examining the image and determining the location of a main or target object within the image.

In an embodiment, the orientation of the monopole may be used as a command signal to determine the desired orientation, e.g., pan or tilt of the camera. This may be in addition to the commands issued from the user interface or joystick. For example, as the operator rolls the monopole, as sensed via one or more sensors, the motors may be moved to pan or tilt the camera. Alternatively, as the operator tilts the monopole, the motors may be moved to pan or tilt the camera. The command signal may be further filtered to retain camera stabilization in combination with user control of camera orientation. As one skilled in the art will recognize, the example embodiments may be combined to create a system of stabilization and control that regulates the camera orientation relative to user movements.

An embodiment allows the operator to specify the camera movements in the image frame. In an embodiment, an operator may touch a point in the image, e.g., as displayed on a touch screen display user interface, to provide an input allowing the camera to move in that direction. For example the operator can pan the image left or right, or the operator may tilt the image up or down. The user inputs to the user interface may be processed to control the motor(s) of the gimbal to reorient the camera's viewing axis. The movement may be coordinated automatically, e.g., camera roll may be automatically controlled such that the image remains level during the pan or tilt movement commanded by the user. Furthermore, the movement of the motors may be coordinated based on commands obtained from vision processing. For example, a user may control the view of the camera to keep focus on a particular face in an image, to track an object, etc. As another example, the commands may be based on a focal distance, e.g., taking a view in the middle of an image, based on the focal distance, and calculating the point in space to obtain a fixed point for the camera to view.

In an embodiment, the camera is mounted onto the gimbal with a rotational offset or at an angle, where the gimbal axes do not align with the camera axes. For example, pan, tilt or roll may not map directly to the three rotational axes of the motors of the gimbal. Instead an algorithm creates compound movements for the motors to enable operators to specify pan, tilt, or roll of the camera and its view.

The camera also may be mounted with an offset angle to orient the useable range of motion toward the most likely target area. An example of a 45 degree offset angle is used throughout as an example, although this angle may be selected to suit a particular purpose. Placing the camera at an offset means the useable range of camera angles is targeted to one side with respect to the monopole. This also provides an asymmetry or handedness (e.g., left handed or right handed set up). Having the camera offset to one side is not a detriment to obtaining shots with the camera on the other side, as the motors may be commanded to flip the camera upside down, for example, in which case the useable range of angles is targeted to the other side. Electronic processing can be used to rotate the image right-side up in such a condition. Thus, with an appropriate mode selection, the user can gain access to both ranges of motion with simple commands, increasing the overall useable range.

The user interface may use a joystick style interface, although as with other elements described throughout a joystick is not a requirement. The user interface may command image pan or tilt through operation of the motors. The user interface may command a rate of change of pan or tilt. For example, when a user pushes a joystick type user interface, the camera keeps moving at a pre-determined rate, whereas on release of the joystick, the camera movement stops. The user interface may alternatively command values of pan or tilt. For example, when a user pushes a joystick type user interface, the camera moves to some predetermined angle or increment, whereas on release of the joystick, the camera returns to a zero angle or its original position or a predetermined position, etc.

The user may provide camera control (e.g., pan or tilt) by reorienting the boom. For example, rolling the boom about the main boom axis (without changing the camera's location) may act as a command to pan/tilt the camera.

The camera may also be stabilized to remain fixed with respect to world, i.e., always point in the same absolute direction. Additionally, the camera may be stabilized to remain fixed relative to the operator. For example, if the operator turns to the right, the camera will also turn to the right.

As will be apparent to those having ordinary skill in the art, the various embodiments may be combined to create an intuitive and capable interface.

The description now turns to the figures. The example embodiments will be best understood with reference to the figures, which illustrated certain representative example embodiments.

Referring to FIG. 1, an example motorized, hand-held monopole for a camera is illustrated. In FIG. 1 is it shown that the monopole 101, which may include a telescopic region 102, is configured to be a hand-held unit. The user may operate the motorized monopole 101 using one or two hand operation.

Figure 4:
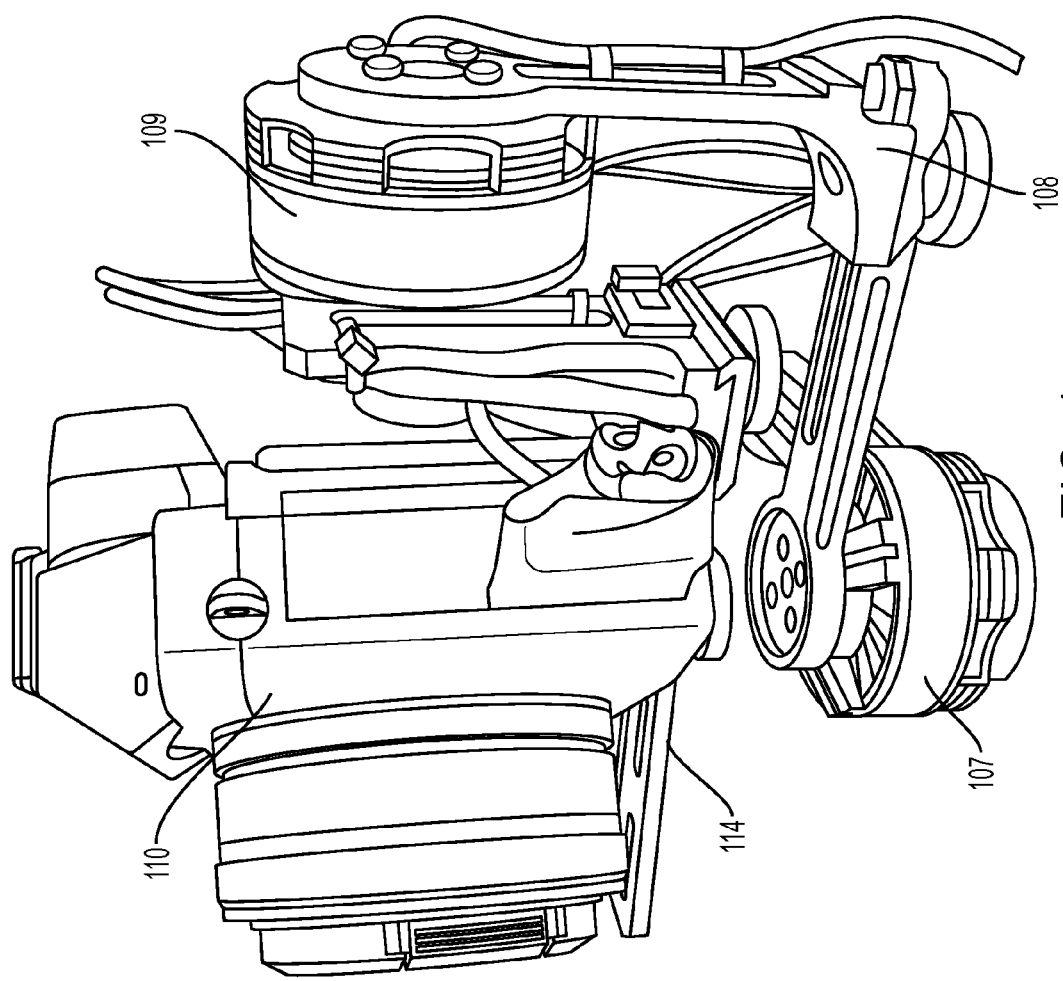
FIG. 4 illustrates a view of a camera attached to the three-axis gimbal.

At one end of the monopole 101 is a three-axis gimbal that includes a first motor 105, a connecting element 106, a second motor 107, a second connecting element (element 108, illustrated in FIG. 4), a third motor (element 109, illustrated in FIG. 4) and a camera mounting plate (element 114, illustrated in FIG. 4). Elements of the gimbal may be provided in series, i.e., one connected to the next; however, different arrangements of these elements or more or fewer elements may be provided. By way of example, in an embodiment a three-axis gimbal is provided such that three motors, e.g., 105, 107 and 109, provide three independent or different possible axes of rotation to the gimbal. More motors may be provided to offer additional axes of rotation. Likewise, other arrangements of connecting elements may be provided. The three-axis gimbal illustrated by way of example in the figures provides an offset from the monopole 101 such that the camera 110, mounted on camera mounting plate 114, can move in a wide range of motion depending on the needs of the user.

As illustrated in FIG. 1, the first motor 105 is oriented such that it rotates about an axis running along a long axis of the monopole 101, i.e., the main boom axis of rotation. This is not a strict requirement, as will become apparent through reviewing the description provided herein. The first motor 105 may therefore provide rotational movement of the first connecting element 106 with respect to the monopole or a connection thereto (element 115, illustrated in FIG. 5). This re-orients the position of the second motor 107, as it is attached to the first connecting element 106.

The first connecting element 106 and the second motor 107 are in turn attached to the second connecting element 108 and the third motor 109, as illustrated in FIG. 4. The second motor 107 rotates about a unique axis as compared to the first motor 105, such that the second motor 107 independently may rotate the second connecting element 108 with respect to the first connecting element 106. In this way, two degrees of freedom are achieved by the placement of the first motor 105 and the second motor 107.

Figure 2:
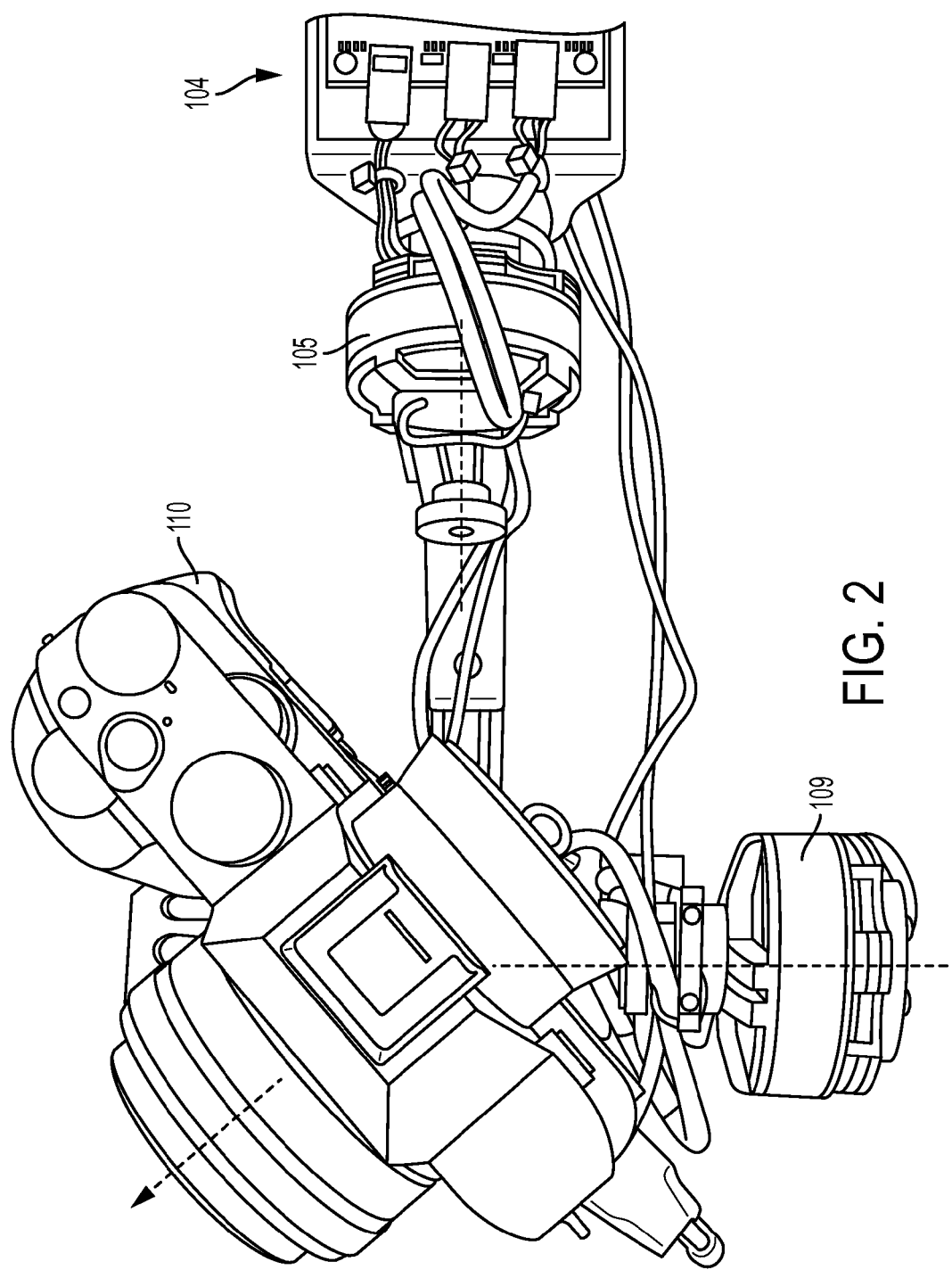
FIG. 2 illustrates a view of an example motorized, three-axis gimbal attached to a hand-held monopole with a camera.
Figure 3:
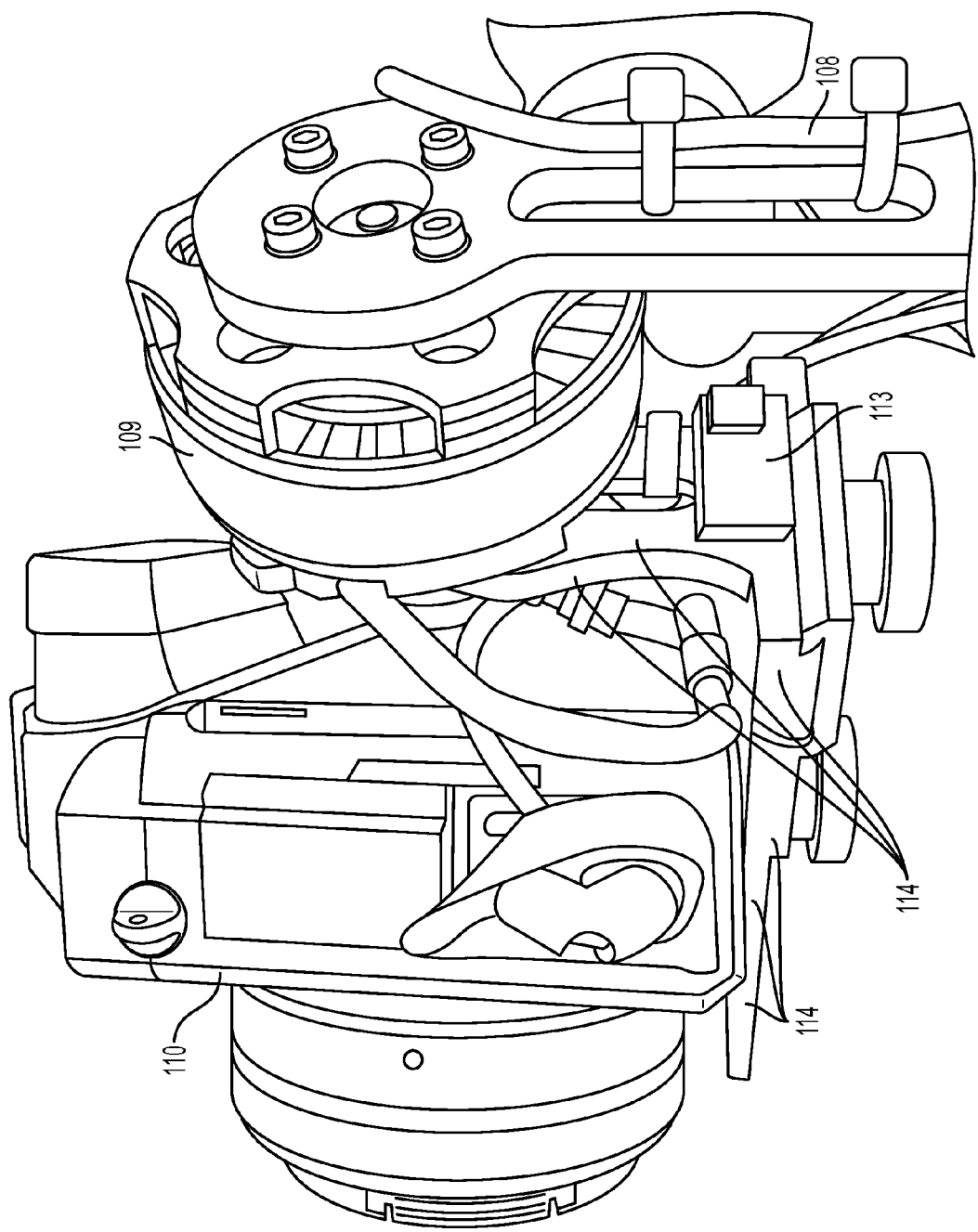
FIG. 3 illustrates a close up view of a camera sitting on a camera mounting plate attached to one end of the three-axis gimbal.

As illustrated in FIG. 2 and FIG. 3, a third motor 109 is connected to the second connecting element 108 and the camera mounting plate 114. The third motor 109 rotates on an axis unique with respect to the first motor 105 and second motor 107, such that a third degree of freedom is achieved. As may be appreciated, depending on the orientation the user places the monopole 101 in, each of the first motor 105, second motor 107 and third motor 109 may contribute to adjusting or stabilizing the pan, tilt or rotation of the camera 110 and thus of the image (video data or still image) captured by the camera 110.

FIG. 2 offers at top view of the three-axis gimbal of an embodiment in which the camera 110 is illustrated as sitting on the camera mounting plate 114 at an angle with respect to the axis running along the length of the monopole 101. It may be appreciated that if the axis running along the length of the monopole 101 is considered normal, the camera 110 is offset to a viewing axis that is about 45 degrees from normal (in this example, looking to the right). Likewise, it may be appreciated that the third motor 109 is positioned about 90 degrees (to the left in this example) from normal or about 135 degrees from the axis or view of the camera 110. It may be appreciated that the first motor 105, second motor 107 and third motor may coordinate their rotation about their respective axes of rotation to control the roll, pitch or tilt of the camera mounting plate 114 and thus of the camera 110.

As may be further appreciated from reviewing FIG. 2, neither the camera viewing axis (dashed arrow), nor the horizontal axis in the image produced by the camera, nor the vertical axis in the image produced by the camera need to be aligned (or even closely aligned) with any of the motor axes (two of which are illustrated with dashed lines in FIG. 2). Practically, the camera 110 and motors 105, 107 and 109 are at offset angles. Some axes may still be orthogonal relative to each other, but some axes are not. This configuration has benefits in range of motion, keeping the motors/gimbal out of the image, etc. In contrast to a pair-wise comparison of axes, i.e., motor 105 axis compared to motor 107 axis, motor 107 axis to motor 109 axis, motor 109 axis to camera 110 viewing axis, motor 109 axis to image horizontal axis, motor 109 axis to image vertical axis, a conventional system would keep these either orthogonal or parallel (or nearly so). In an embodiment, these axes are deliberately set at offset angles, as illustrated. As described herein, this imparts and asymmetry to the system (the system illustrated is configured for right handed use).

A closer view of an example camera mounting plate 114 is provided in FIG. 3. The camera mounting plate 114 may take the shape of an "L" or generally an element that includes two edges oriented at about 90 degrees to one another. In the example shown in FIG. 3, the camera 110 is attached to the camera mounting plate 114 using screws. As described herein, one or more IMUs may be provided. One IMU 113 is illustrated in FIG. 3 in a position attached to the camera mounting plate 114. The IMU 113 at the camera mounting plate 114 provides feedback data regarding the position, orientation, acceleration, etc., of the camera mounting plate 114 to a control module 104 (referring back to FIG. 1). This provides data allowing inertial stabilization of the camera 110 by the first motor 105, the second motor 107 or the third motor 109, or a combination thereof.

Shown in FIG. 4 is an end-on view of the three-axis gimbal with the monopole 101 facing away. The camera 110 and camera mounting plate 114 are attached to the third motor 109 via a suitable connection such that movements of the camera mounting plate 114 and camera 110 may be achieved via rotational movement of the third motor 109. Likewise, movement of the third motor 109 may be achieved via motion of the first motor 105 or the second motor 107. As illustrated in FIG. 4, the second motor 107 is positioning between third motor 109 and the monopole 101. The third motor 109 and the second motor 107 are linked using a connecting element 108, which as with other elements may take a unitary (single piece) or modular (more than one piece) construction. The connecting element 108 illustrated linking the second motor 107 and the third motor 109 is shown having two edges that are oriented about 90 degrees to one another, similar in shape to the camera mounting plate 114 and the first connecting element 106.

Figure 5:
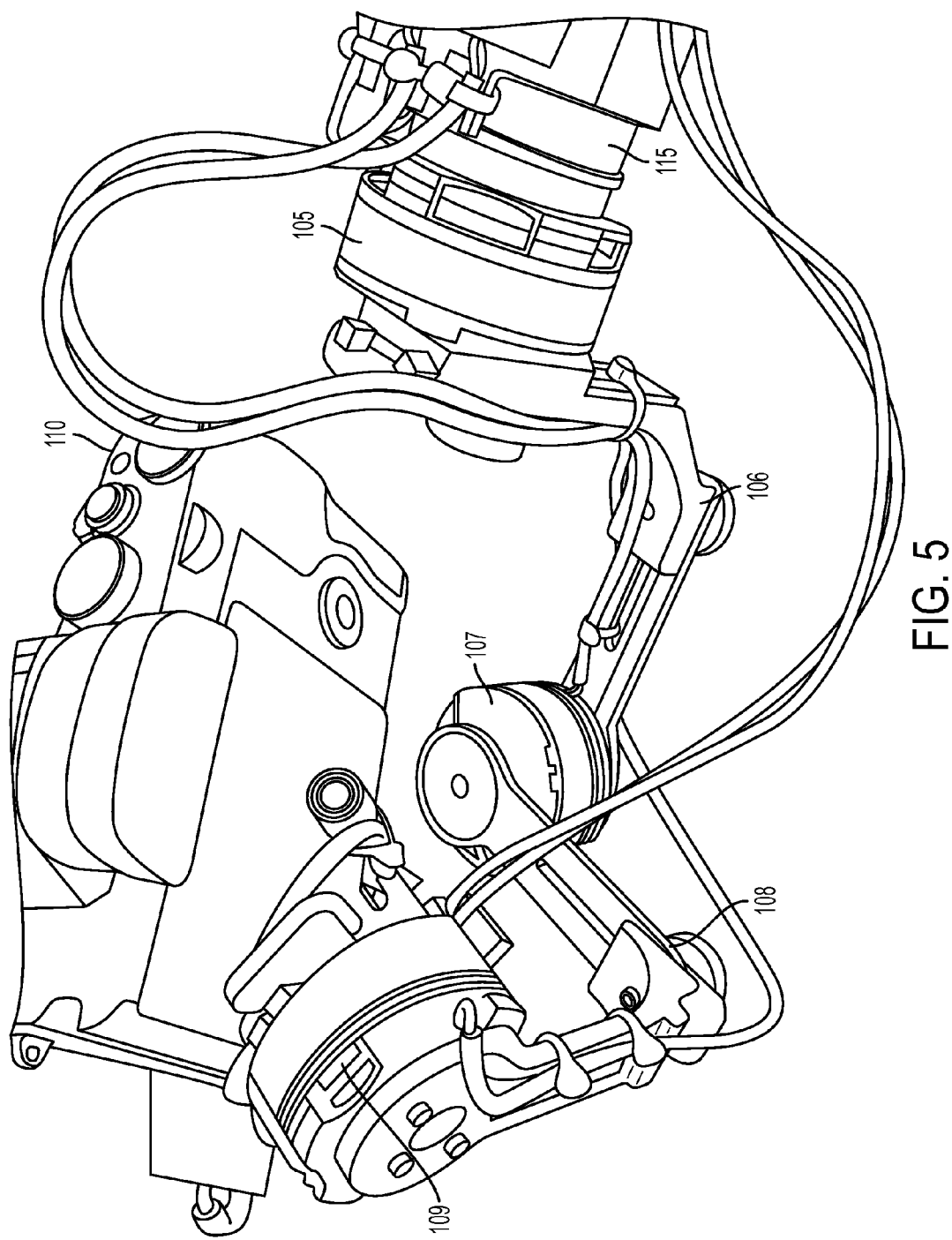
FIG. 5 illustrates a view of the three-axis gimbal, camera and attachment to a hand-held monopole.

A complete view of an example linkage between the connector 115 for the monopole 101, the first motor 105, the first connecting element 106, the second motor 107, the second connecting element 108, the second motor 109 and the camera mounting plate 114 is illustrated in FIG. 5. Here it may be appreciated that the first motor 105, second motor 107 and third motor 109 provide unique axes about which rotational movement may be provided. Moreover, the connecting elements 106 and 108 permit a wide range of motion such that the user may manipulate the camera 110 within a wide range of possible viewing angles.

Figure 6:
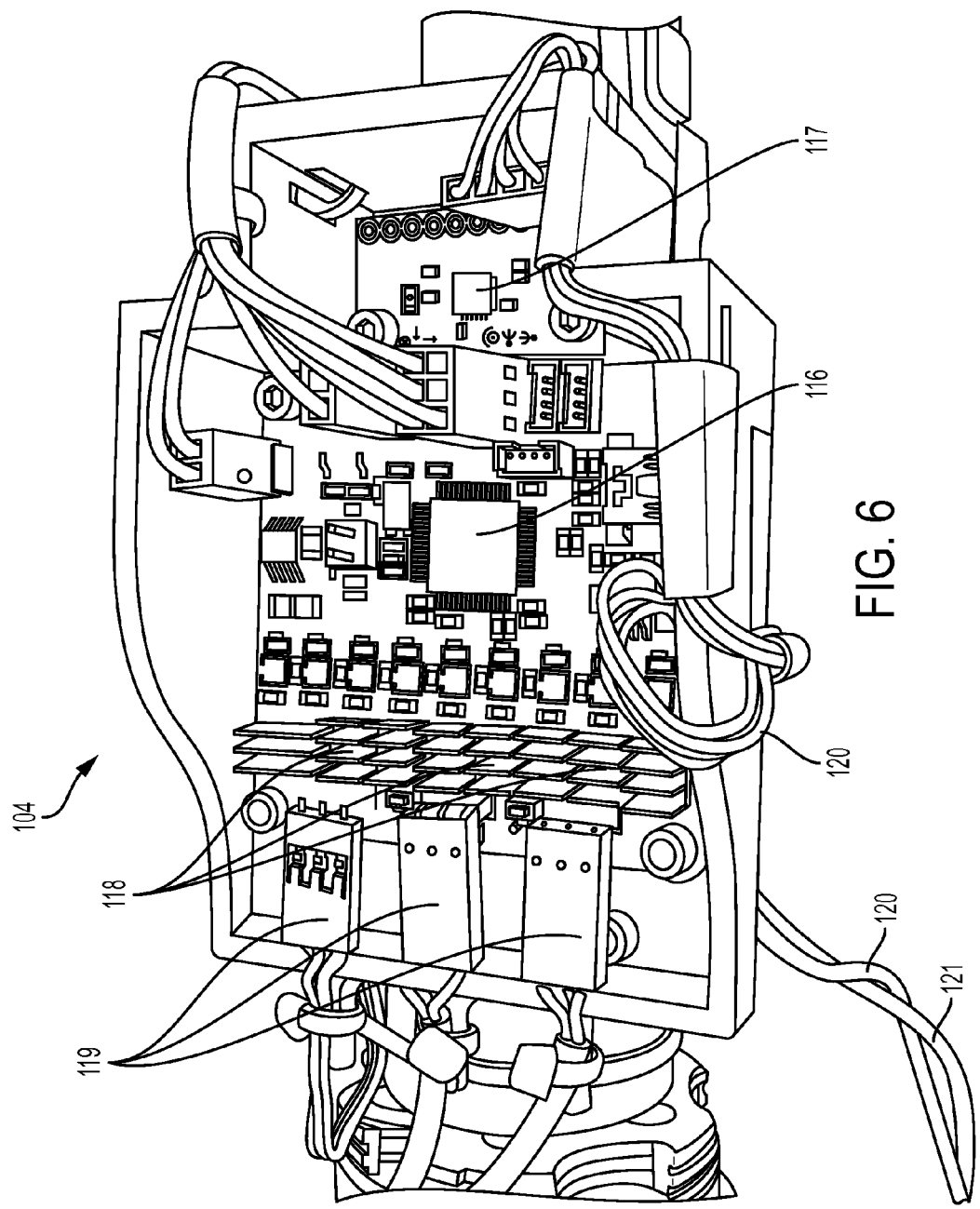
FIG. 6 illustrates example electronics included with a three-axis gimbal or hand-held monopole.

The first motor 105, second motor 107 and third motor 109 cooperate to control the camera 110 such that it is stabilized and may also be manipulated to different viewing angles by the user, e.g., using a user interface 111. As illustrated in FIG. 6, a module 104 may be provided with electronics that take in sensed information, e.g., from IMU 113 at the camera mounting plate 114 or the IMU 117 positioned with respect to the monopole 101. Module 104 may include a CPU 116, IMU 117, a PCB, connection interfaces 119, motor power amplifiers 118 and other electronics for receiving user inputs, sensed commands, and image data and provide outputs to various components, e.g., power and data output to the motors, image data outputs to a connected display, etc. As will be appreciated by those having ordinary skill in the art, the electronics of the module 104 may be varied, e.g., more of fewer IMUs may be utilized, other sensors may be utilized, various different types of connection interfaces may be provided, etc.

The CPU 116 executes instructions to control the first motor 105, the second motor 107 and third motor 109 such that the motion of the camera 110 is stabilized or smoothed, e.g., integrated with user inputs or movements of the monopole 101. The CPU may execute instructions of a program that permits controlled movements to be provided to the camera 110 via inputs from a user interface 111. In this regard, the CPU and program may translate user inputs, e.g., to a joystick user interface 111 or provided by manipulation of the monopole 101, or both, such that the first motor 105, second motor 107 and third motor 109 are commanded in a coordinated fashion for smooth, stabilized movement of the camera 110 according to movement of the joystick user interface 111 or the monopole 101 itself.

The CPU may stabilize the camera 110 by executing a program of instructions that automatically responds to sensed data, e.g., movement of the monopole 101 as sensed by IMU 117 or movement of the camera mounting plate 114 as sensed by IMU 113. For example, using sensed data from an IMU, the CPU may stabilize the motion of the camera 110 using the first motor 105, the second motor 107 and the third motor 109, or a combination thereof. As may be appreciated, the sensed data from IMU 113, IMU 117, other sensors, if any, and the user inputs provided via the user interface 111 may be integrated such that controlled, stabilized motion commands are given to the first motor 105, second motor 107 and the third motor 109, stabilizing or moving camera mounting plate 114 and the camera 110 according to user instructions.

Figure 7:
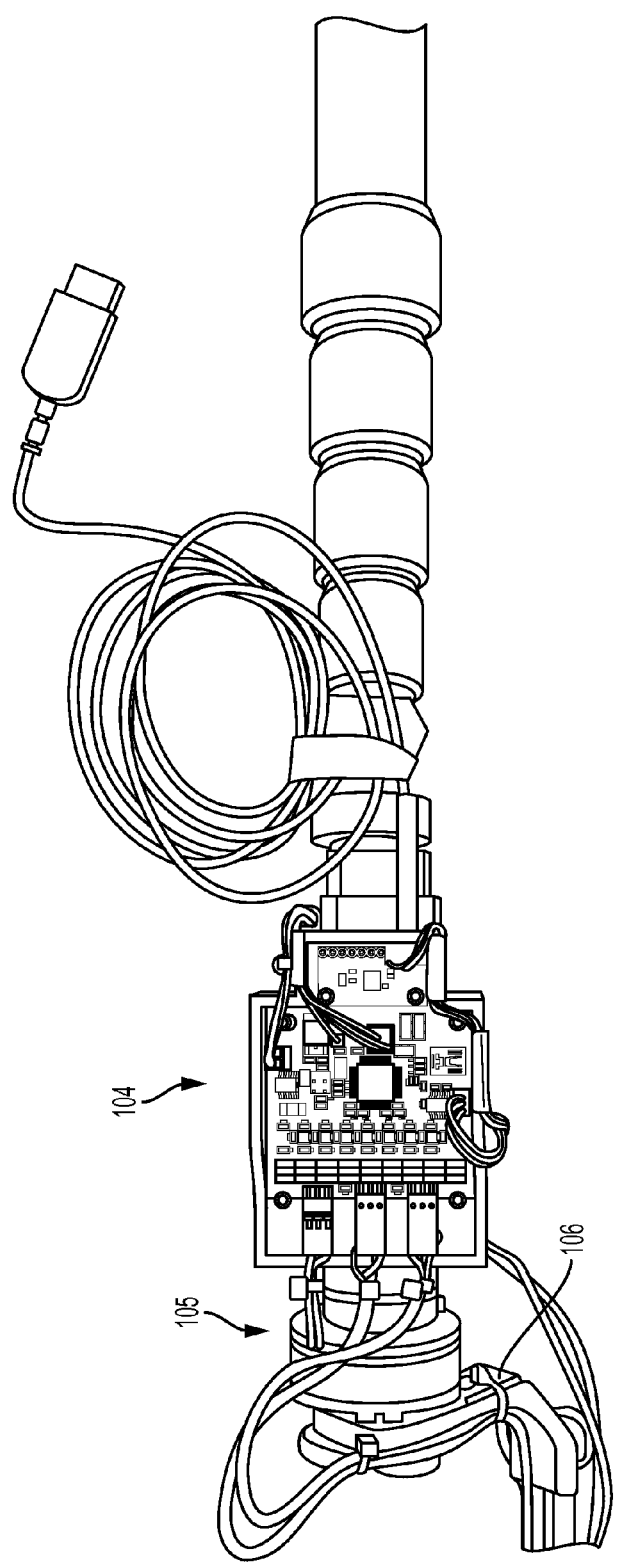
FIG. 7 illustrates a view of the electronics positioned on a hand-held monopole.

FIG. 7 offers a top view of the monopole 101 with a module 104 provided therewith. The module 104 may be provided in a variety of positions, although in the example of FIG. 7 the module 104 is attached at a distal end of the monopole 101, adjacent to the connector, first motor 105 and first connecting element 106.

Figure 8:
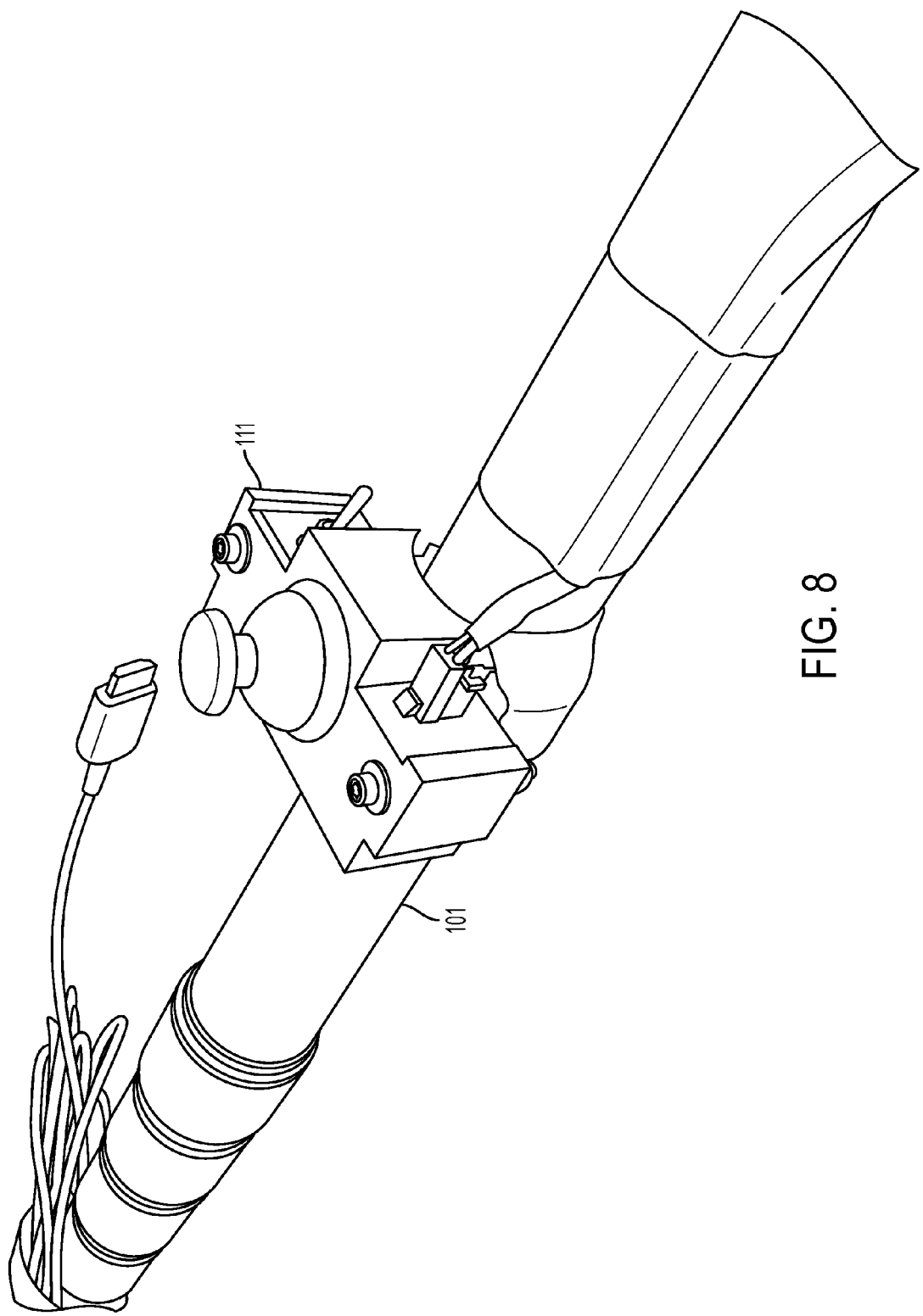
FIG. 8 illustrates a view of a user interface positioned on a hand-held monopole.

A user interface 111, as illustrated in the example of FIG. 8, provides the user with the ability to move the camera via the first motor 105, second motor 107 and third motor 109. Here, the user interface 111 is illustrated as a joystick type control. The movement of the joystick of the user interface 111 may provide inputs to the module 104 such that these inputs may be converted or transformed into commands for the first motor 105, second motor 107 or third motor 109, as appropriate.

Referring back to FIG. 1, a battery pack 112 may be provided, as illustrated in the example of FIG. 1 at the end of the monopole 101 opposite to the three axis gimbal. The battery pack 112 provides power to the module 104, user interface 111, the first motor 105, the second motor 107 and the third motor 109. The battery pack 112 may provide power via direct or indirect wiring with the various powered elements. As may be appreciated, the battery pack 112 may be wired to provide power to additional elements, e.g., camera 110.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments have been described herein, it is to be understood that the embodiments are not limited to those precise embodiments, and that various other changes and modifications may be affected therein by one skilled in the art without departing from the scope or spirit of the disclosure.

What is claimed is:

1. A motorized multi-axis gimbal for a camera, comprising:
    an attachment for securing a hand-held monopole;
    a plurality of motors connected to the multi-axis gimbal; and
    an attachment for a camera mounting plate;

the plurality of motors providing a plurality of independent rotational axes for movement of gimbal components; and the plurality of motors in operative connection with a processing unit that issues coordinated rotational commands to control movement of an attached camera;

wherein components of the multi-axis gimbal corresponding to a camera viewing axis, a horizontal image axis, and a vertical image axis of a camera mounted on the camera mounting plate are positioned at offset angles with respect to the corresponding camera axis allowing the camera axis to not be aligned with any of a rotational axis to the corresponding motor.

2. A motorized monopole for a camera, comprising:

a hand-held monopole attached to a multi-axis gimbal;

a first motor positioned at an end of the hand-held monopole;

a first connecting element of the multi-axis gimbal attached to the first motor, the first motor imparting active rotational movement to the first connecting element with respect to the monopole;

a second motor positioned at an end of the first connecting element;

a second connecting element of the multi-axis gimbal attached to the second motor, the second motor imparting active rotational movement to the second connecting element with respect to the first connecting element;

a third motor positioned at an end of the second connecting element; and a camera mounting plate of the multi-axis gimbal attached to the second connecting element via the third motor, the third motor imparting active rotational movement to the camera mounting plate with respect to the second connecting element;

wherein components of the multi-axis gimbal are positioned such that a camera viewing axis, a horizontal image axis, and a vertical image axis of a camera mounted on the camera mounting plate need not be aligned with any of a rotational axis of the first motor, a rotational axis of the second motor, or a rotational axis of the third motor.

3. The motorized monopole of claim 2, wherein the first motor, the second motor and the third motor each rotate about a unique axis to control roll, yaw and pitch of the camera mounting plate.

4. The motorized monopole of claim 2, wherein:

the rotational axis of the third motor is not aligned with any of the camera viewing axis, the horizontal image axis, and the vertical image axis; and the camera mounting plate accommodates a camera mounted at an offset from normal.

5. The motorized monopole of claim 4, wherein the second motor and the third motor rotate about axes that are oriented at about 90 degrees from one another.

6. The motorized monopole of claim 2, wherein one or more of the first connecting element and the second connecting element are formed of multiple elements.

7. The motorized monopole of claim 2, wherein the first connecting element and the second connecting element each include two edges oriented at about 90 degrees to one another.

8. The motorized monopole of claim 2, further comprising one or more inertial measurement units.

9. The motorized monopole of claim 8, wherein the camera mounting plate and the monopole each include an inertial measurement unit.

10. The motorized monopole of claim 2, wherein the camera mounting plate includes two edges oriented at about 90 degrees to one another.

11. The motorized monopole of claim 2, further comprising:

a user interface; and a module including a processor and a memory, wherein the processor is in operative communication with the memory, the first motor, the second motor, the third motor and the user interface.

12. The motorized monopole of claim 11, wherein the module comprises at least one inertial measurement unit operatively coupled to the processor.

13. The motorized monopole of claim 12, further comprising a display device.

14. The motorized monopole of claim 13, wherein the display device displays data obtained from the module.

15. The motorized monopole of claim 12, wherein the first motor rotates about an axis running along the length of the monopole.

16. The motorized monopole of claim 11, wherein user inputs to the user interface are translated into movements of the camera mounting plate by the processor operating one or more of the first motor, the second motor and the third motor in a coordinated fashion.

17. The motorized monopole of claim 11, further comprising:

a battery pack operatively coupled to the processor and the memory; and a connection linking the first motor, the second motor, and the third motor to the battery pack.

18. The motorized monopole of claim 11, wherein the multi-axis gimbal is asymmetric.

19. A motorized multi-axis gimbal for a camera, comprising:

an attachment for securing a hand-held monopole;

a module including a processor and a memory;

a first motor positioned at the attachment and operatively coupled to the processor;

a first connecting element attached to the first motor, the first motor imparting active rotational movement to the first connecting element with respect to the attachment;

a second motor positioned at an end of the first connecting element and operatively coupled to the processor;

a second connecting element attached to the second motor, the second motor imparting active rotational movement to the second connecting element with respect to the first connecting element;

a third motor positioned at an end of the second connecting element and operatively coupled to the processor; and a camera mounting plate linked to the second connecting element via the third motor, the third motor imparting active rotational movement to the camera mounting plate with respect to the second connecting element;

wherein components of the multi-axis gimbal are positioned such that a camera viewing axis, a horizontal image axis, and a vertical image axis of a camera mounted on the camera mounting plate need not be aligned with any of a rotational axis of the first motor, a rotational axis of the second motor, or a rotational axis of the third motor.

20. The motorized multi-axis gimbal of claim 19, further comprising the monopole.

21. The motorized multi-axis gimbal and monopole of claim 20, wherein select movements of the monopole are translated into movements of the camera mounting plate by a processor operating one or more of the first motor, the second motor, and the third motor in a coordinated fashion.

22. The motorized multi-axis gimbal and monopole of claim 20, wherein rotational movements about an axis along the length of the monopole are translated into rotational movements of a camera attached to the camera mounting plate about the vertical image axis by a processor operating one or more of the first motor, the second motor, and the third motor in a coordinated fashion.

* * * * *